United States Patent
Monk (10) Patent No.: US 8,290,832 B2
(45) Date of Patent: Oct. 16, 2012

(54) METHOD AND SYSTEM FOR HANDLING RETURNED PREPAID PAYMENT CARDS

(75) Inventor: Justin T. Monk, Parker, CO (US)

(73) Assignee: Visa U.S.A. Inc., San Francisco, CA (US)

( * ) Notice: Subject to any disclaimer, the term of this patent is extended or adjusted under 35 U.S.C. 154(b) by 290 days.

(21) Appl. No.: 11/757,983

(22) Filed: Jun. 4, 2007

(65) Prior Publication Data

US 2008/0301011 A1 Dec. 4, 2008

(51) Int. Cl.
| | |
|---|---|
| *G06Q 10/00* | (2012.01) |
| *G07B 17/00* | (2006.01) |
| *G07B 17/02* | (2006.01) |
| *G07F 19/00* | (2006.01) |
| *B65B 35/00* | (2006.01) |
| *G06F 9/00* | (2006.01) |
| *G06F 17/00* | (2006.01) |

(52) U.S. Cl. ............. 705/28; 705/30; 705/406; 705/410

(58) Field of Classification Search .................... 705/30, 705/28, 406, 410
See application file for complete search history.

(56) References Cited

U.S. PATENT DOCUMENTS

| | | | |
|---|---|---|---|
| 5,146,067 A * | 9/1992 | Sloan et al. ................... 235/381 |
| 5,465,206 A | 11/1995 | Hilt et al. | |
| 5,477,038 A | 12/1995 | Levine et al. | |
| 5,500,513 A | 3/1996 | Langhans et al. | |
| 5,504,677 A * | 4/1996 | Pollin ............................ 705/45 |
| 5,621,201 A | 4/1997 | Langhans et al. | |
| 5,684,291 A * | 11/1997 | Taskett .......................... 235/487 |
| 5,815,665 A | 9/1998 | Teper et al. | |
| 5,845,070 A | 12/1998 | Ikudome | |
| 6,247,129 B1 | 6/2001 | Keathley et al. | |
| 6,270,011 B1 | 8/2001 | Gottfried | |
| 6,282,522 B1 | 8/2001 | Davis et al. | |
| 6,298,336 B1 * | 10/2001 | Davis et al. ...................... 705/41 |
| 6,473,500 B1 * | 10/2002 | Risafi et al. .............. 379/144.01 |
| 6,560,581 B1 | 5/2003 | Fox et al. | |
| 6,564,264 B1 * | 5/2003 | Creswell et al. .............. 709/245 |
| 6,837,425 B2 | 1/2005 | Gauthier et al. | |
| 6,915,279 B2 | 7/2005 | Hogan et al. | |
| 6,920,611 B1 | 7/2005 | Spaeth et al. | |
| 6,957,334 B1 | 10/2005 | Goldstein et al. | |
| 7,007,840 B2 | 3/2006 | Davis | |
| 7,031,959 B2 * | 4/2006 | Garner et al. ......................... 1/1 |
| 7,039,611 B2 | 5/2006 | Devine | |
| 7,051,923 B2 | 5/2006 | Nguyen et al. | |
| 7,104,446 B2 | 9/2006 | Bortolin et al. | |
| 7,111,789 B2 | 9/2006 | Rajasekaran et al. | |

(Continued)

OTHER PUBLICATIONS

U.S. Appl. No. 11/757,623, Monk.

(Continued)

*Primary Examiner* — Ig T An (74) *Attorney, Agent, or Firm* — Kilpatrick, Townsend & Stockton LLP (57) ABSTRACT

A method and system for handling returned prepaid device in a payment system. In one embodiment, upon receipt of a returned prepaid device corresponding to a consumer's account, a method indicates in the consumer's account that an address of the consumer is invalid; and determines whether the device should be stored in order to possibly re-send the device to the consumer if a new valid consumer address is received, or to destroy the device and refund the purchaser.

24 Claims, 3 Drawing Sheets

U.S. PATENT DOCUMENTS

| | | | |
|---|---|---|---|
| 7,121,456 B2 | 10/2006 | Speath et al. | |
| 7,124,937 B2 | 10/2006 | Myers et al. | |
| 7,136,841 B2 | 11/2006 | Cook | |
| 7,152,780 B2 | 12/2006 | Gauthier et al. | |
| 7,177,836 B1* | 2/2007 | German et al. | 705/40 |
| 7,243,853 B1 | 7/2007 | Levy et al. | |
| 7,280,981 B2 | 10/2007 | Huang et al. | |
| 2001/0010334 A1* | 8/2001 | Park et al. | 235/462.14 |
| 2001/0019604 A1* | 9/2001 | Joyce et al. | 379/114.2 |
| 2002/0004821 A1* | 1/2002 | Togawa et al. | 709/206 |
| 2002/0046341 A1* | 4/2002 | Kazaks et al. | 713/182 |
| 2002/0111919 A1 | 8/2002 | Weller et al. | |
| 2002/0194138 A1 | 12/2002 | Dominguez et al. | |
| 2003/0001005 A1* | 1/2003 | Risafi et al. | 235/380 |
| 2003/0120593 A1 | 6/2003 | Bansal et al. | |
| 2003/0172040 A1 | 9/2003 | Kemper et al. | |
| 2003/0200184 A1 | 10/2003 | Dominguez et al. | |
| 2003/0212642 A1 | 11/2003 | Weller et al. | |
| 2003/0233292 A1 | 12/2003 | Richey et al. | |
| 2004/0015493 A1* | 1/2004 | Garner et al. | 707/3 |
| 2004/0019522 A1 | 1/2004 | Bortolin et al. | |
| 2004/0044621 A1 | 3/2004 | Huang et al. | |
| 2004/0050922 A1 | 3/2004 | Gauthier et al. | |
| 2004/0054581 A1 | 3/2004 | Redford et al. | |
| 2004/0054590 A1 | 3/2004 | Redford et al. | |
| 2004/0054591 A1 | 3/2004 | Spaeth et al. | |
| 2004/0059688 A1 | 3/2004 | Dominguez et al. | |
| 2004/0088225 A1* | 5/2004 | Foth et al. | 705/26 |
| 2004/0099730 A1* | 5/2004 | Tuchler et al. | 235/380 |
| 2004/0132449 A1* | 7/2004 | Kowarsch | 455/432.1 |
| 2004/0139021 A1 | 7/2004 | Reed et al. | |
| 2004/0148224 A1 | 7/2004 | Gauthier et al. | |
| 2004/0153715 A1 | 8/2004 | Spaeth et al. | |
| 2004/0220964 A1 | 11/2004 | Shiftan et al. | |
| 2005/0021456 A1 | 1/2005 | Steele et al. | |
| 2005/0029344 A1 | 2/2005 | Davis | |
| 2005/0036611 A1 | 2/2005 | Seaton, Jr. et al. | |
| 2005/0045718 A1 | 3/2005 | Bortolin et al. | |
| 2005/0049890 A1* | 3/2005 | Kan | 705/1 |
| 2005/0058427 A1 | 3/2005 | Nguyen et al. | |
| 2005/0071225 A1 | 3/2005 | Bortolin et al. | |
| 2005/0071226 A1 | 3/2005 | Nguyen et al. | |
| 2005/0071227 A1 | 3/2005 | Hammad et al. | |
| 2005/0071228 A1 | 3/2005 | Bortolin et al. | |
| 2005/0071235 A1 | 3/2005 | Nguyen et al. | |
| 2005/0102234 A1 | 5/2005 | Devine | |
| 2005/0121506 A1 | 6/2005 | Gauthier et al. | |
| 2005/0149455 A1 | 7/2005 | Bruesewitz et al. | |
| 2005/0159962 A1* | 7/2005 | Weiss et al. | 705/1 |
| 2005/0177437 A1* | 8/2005 | Ferrier | 705/26 |
| 2005/0234911 A1* | 10/2005 | Hess et al. | 707/9 |
| 2005/0246278 A1 | 11/2005 | Gerber et al. | |
| 2005/0283416 A1 | 12/2005 | Reid et al. | |
| 2005/0283430 A1 | 12/2005 | Reid et al. | |
| 2005/0283431 A1 | 12/2005 | Reid et al. | |
| 2005/0283432 A1 | 12/2005 | Reid et al. | |
| 2005/0283433 A1 | 12/2005 | Reid et al. | |
| 2006/0006224 A1* | 1/2006 | Modi | 235/379 |
| 2006/0080243 A1 | 4/2006 | Kemper et al. | |
| 2006/0149733 A1* | 7/2006 | Garner et al. | 707/6 |
| 2006/0155644 A1 | 7/2006 | Reid et al. | |
| 2006/0163345 A1 | 7/2006 | Myers et al. | |
| 2006/0178957 A1 | 8/2006 | LeClaire | |
| 2006/0179007 A1 | 8/2006 | Davis | |
| 2006/0190347 A1* | 8/2006 | Cuervo | 705/26 |
| 2006/0290501 A1 | 12/2006 | Hammad et al. | |
| 2006/0293027 A1 | 12/2006 | Hammad et al. | |
| 2007/0001000 A1 | 1/2007 | Nguyen et al. | |
| 2007/0001001 A1 | 1/2007 | Myers et al. | |
| 2007/0005613 A1 | 1/2007 | Singh et al. | |
| 2007/0005774 A1 | 1/2007 | Singh et al. | |
| 2007/0012764 A1 | 1/2007 | Bortolin et al. | |
| 2007/0017970 A1 | 1/2007 | Gauthier et al. | |
| 2007/0034679 A1 | 2/2007 | Gauthier et al. | |
| 2007/0055597 A1 | 3/2007 | Patel et al. | |
| 2007/0055630 A1 | 3/2007 | Gauthier et al. | |
| 2007/0057034 A1 | 3/2007 | Gauthier et al. | |
| 2007/0057051 A1 | 3/2007 | Bortolin et al. | |
| 2007/0083465 A1 | 4/2007 | Ciurea et al. | |
| 2007/0100691 A1 | 5/2007 | Patterson | |
| 2007/0125842 A1 | 6/2007 | Antoo et al. | |
| 2007/0136215 A1* | 6/2007 | Fogel et al. | 705/410 |

OTHER PUBLICATIONS

U.S. Appl. No. 11/757,837, Monk.
U.S. Appl. No. 11/757,980, Monk.
U.S. Appl. No. 11/757,914, Monk.
U.S. Appl. No. 11/757,893, Monk.
U.S. Appl. No. 11/757,985, Monk.

* cited by examiner

METHOD AND SYSTEM FOR HANDLING RETURNED PREPAID PAYMENT CARDS

FIELD OF THE INVENTION

This invention relates, in general, to payment devices and, more particularly, to a method and system for handling a returned prepaid device such as a prepaid payment card.

BACKGROUND

Payment cards can be purchased by a first entity (the "card purchaser" or "load source") for the benefit of a second entity (the "cardholder") and loaded with a desired amount of money thereon. These cards are known as prepaid payment cards or prepaid cards. The card purchaser can then have the card mailed to cardholder.

Conventionally, these prepaid cards are mailed to the cardholders via a regular mail, such as through the U. S. Postal Service. However, if the cardholder changes his/her address, the mailed prepaid card may not reach the cardholder and instead may be returned by the Postal Service due to the old or invalid address. The prepaid card may be returned to sender— such as returned to the issuing bank, the credit card company, or some other entity associated with the credit card company.

As recognized by the present inventor, what is needed in one example is a method and system for handling of returned prepaid cards so as to facilitate re-mailing of the card to the cardholder at a new and valid address, or destroying the card and attempting to refund the monies to the card purchaser.

It is against this background that the various embodiments of the present invention were developed.

BRIEF SUMMARY

According to one embodiment, a method for handling a returned prepaid device that, upon receipt of the returned prepaid device corresponding to a consumer's account, indicates in the consumer's account that an address of the consumer is invalid. The method also determines whether to store the returned prepaid device or destroy the returned prepaid device.

The features, utilities and advantages of the various embodiments of the invention will be apparent from the following more particular description of embodiments of the invention as illustrated in the accompanying drawings.

DETAILED DESCRIPTION

Disclosed herein are various methods, systems and other embodiments that provide for handling of returned prepaid payment card in a manner that can, depending on the embodiment, destroy the returned card and attempt to refund or credit the original card purchaser, or re-send the card to the cardholder at an updated and valid address. Various embodiments of the present invention are disclosed herein.

As used herein, the term "card" or "payment card" includes, but is not limited to, for example, credit or debit cards, bank cards, prepaid, preloaded or prefunded cards, such as general purpose reloadable cards, travel cards, payroll cards, teen or student cards, commercial cards, gift cards, or any other type of preloaded, prefunded or prepaid conventional payment card that a customer can use in lieu of a cash payment, and these terms are used interchangeably herein. Such cards are examples of portable consumer devices which may also include phones, key fobs, personal digital assistants, pagers, smart media, transponders, and other suitable devices. The term "transaction" includes but is not limited to bill pay, point-of-service purchase, ATM withdrawal, balance inquiry, or any other purchase type activity through prepaid card usage. The term "cardholder" includes but is not limited to, for example, a cardholder of any type of payment card (as that term is used herein), a customer or account holder, and these terms are used interchangeably herein. The term "acquirer" includes but is not limited to the merchant's payment processor, the merchant's bank or financial institution who acquires transactions from merchants and routes messages, authorizations or clearing drafts between merchants and a prepaid card processing network, and these terms are used interchangeably herein. The term "issuer" includes but is not limited to a bank or other financial institution that issues the prepaid cards. The term "processing network" or "network" includes but is not limited to an electronic payment system, or any conventional network or system for authorizing or processing electronic payments.

Figure 1:
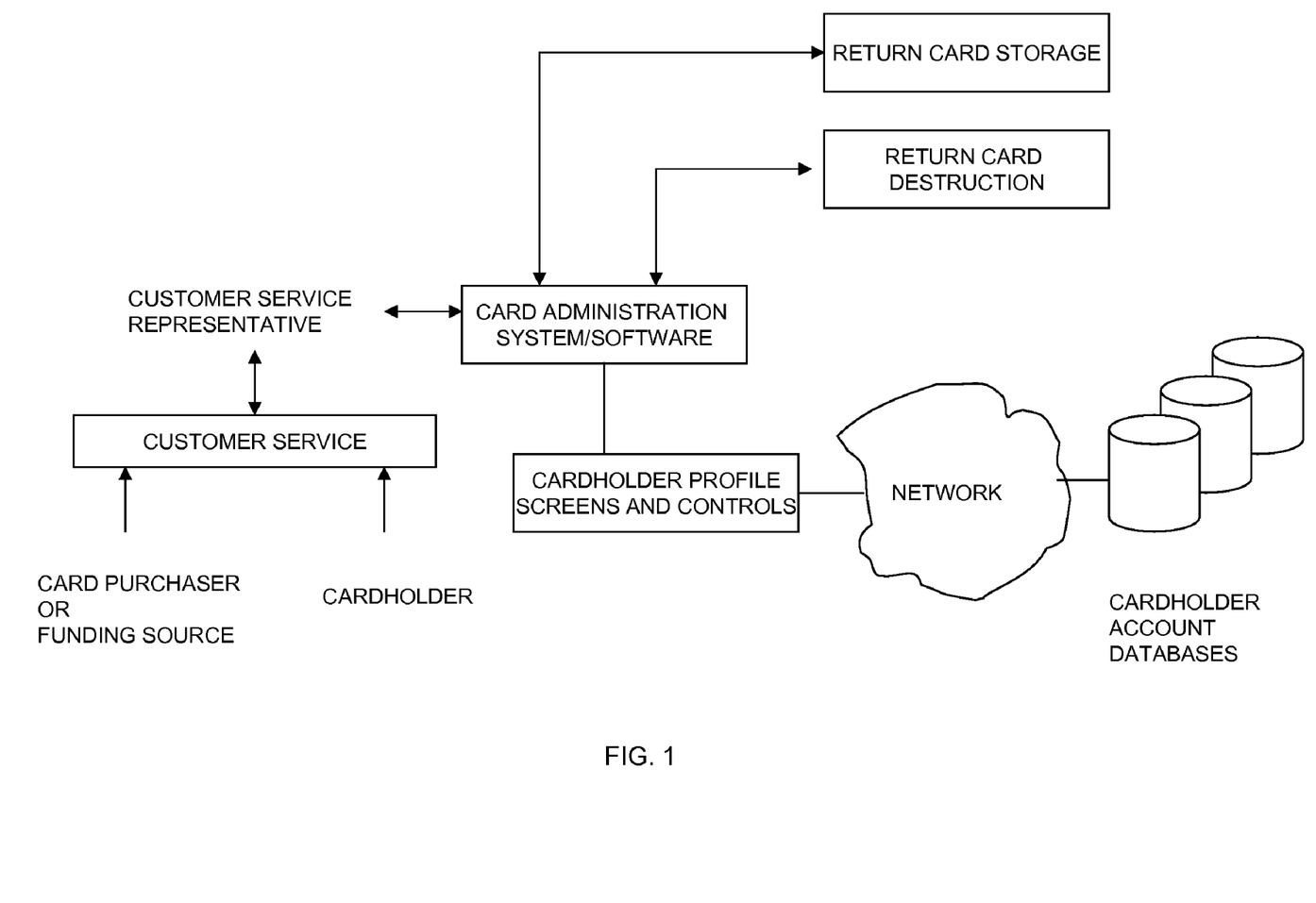
FIG. 1 illustrates a block diagram of an example of a system for handling returned prepaid cards, in accordance with one embodiment of the present invention.
Figure 2:
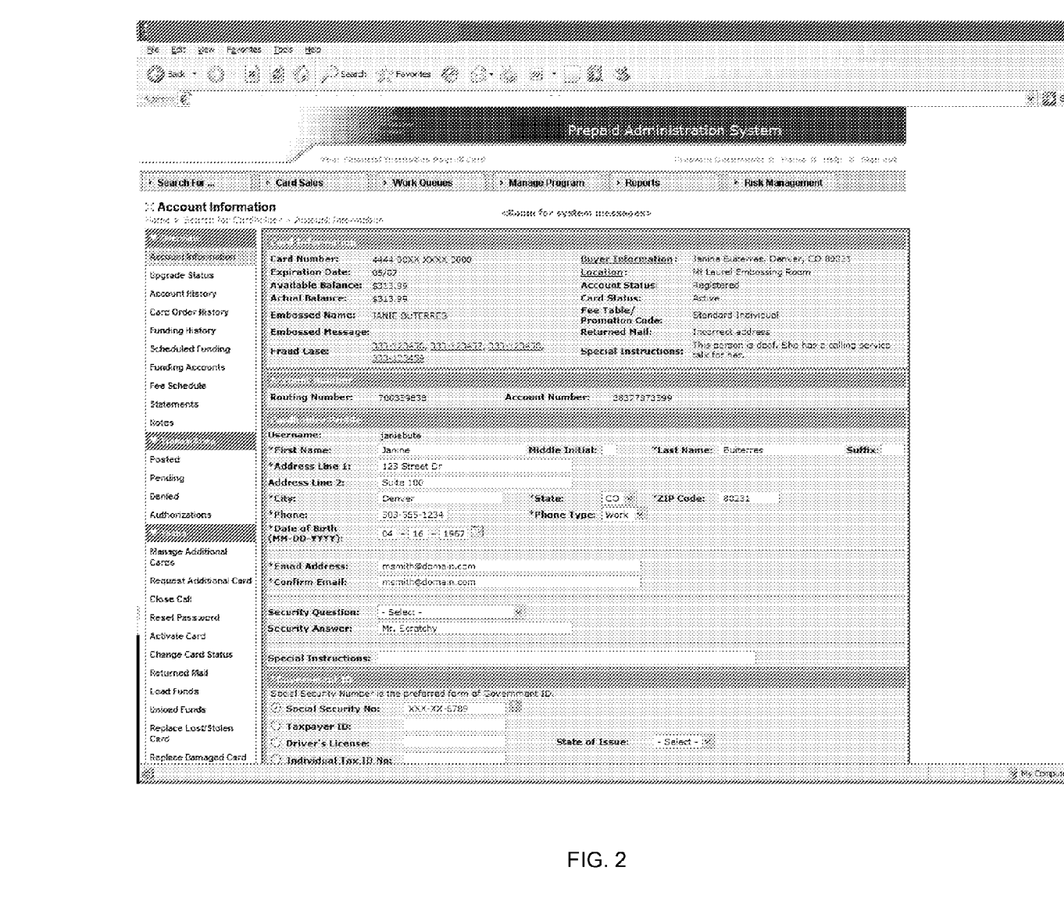
FIG. 2 is a screenshot of a consumer profile screen, in accordance with one embodiment of the present invention.

Referring to FIG. 1, a block diagram of a system for handling returned prepaid payment cards is illustrated, in accordance with one embodiment of the present invention. A card administration system/software component may be provided for use by a customer service representative in viewing information related to a cardholder's account. In one example, the card administration software can be configured to provide various graphical user interfaces, display screens, and controls for a customer service representative to access cardholder account information. The card administration software may be configured to communicate, via a network if desired, with one or more cardholder account databases, which maintain and store account information for a plurality of cardholders. For instance, when a cardholder contacts a customer service representative of the issuer (i.e., via telephone), the customer service representative accesses the cardholder's account information via the card administration software/system and can view one or more cardholder profile screens as desired. One example of a cardholder profile screen is illustrated in FIG. 2, described below.

The card administration software/system may be configured to provide the customer service representative with the ability to input data or associate information with the cardholder's account. The card administration software/system may also include one or more controls, which may be utilized by the customer service representative in order to display profile screens, input data, or perform other functions that may be desired depending upon the particular implementation. In one example, information entered by the customer service representative relating to a cardholder's account is transmitted by the card administration software/system to the account databases, where such information can be stored.

The card administration software/system, in one example, may also be accessible, for example in a limited nature, by individuals such as persons (i.e., mail room personnel of the issuer) that handle returned mail such as returned prepaid cards received from the postal service. In one example, the card administration software can include one or more graphical user interfaces for use by individuals such as mail room personnel, when handling returned prepaid cards. For instance, one or more controls may be provided that permit mail room personnel, upon receipt of an prepaid card that has been "returned to sender," to set a flag or indicator associated with a cardholder account indicating that the prepaid card was returned due to an invalid address. The card administration software may be provided with an address entry field for entry of any forwarding address indicated on the returned statement.

In one example of the invention, accounts associated with returned prepaid cards can be flagged with a status indicator of "Returned/Undeliverable" (indicating that the prepaid card was returned in the mail and not actually received by the cardholder); "Resent" (indicating that an updated address for the cardholder has been received and the prepaid card has been re-sent to the cardholder at the updated address); "Pending Destruction" (indicating that the card has been in storage for a desired number of days and a new valid address for the account has not been obtained, hence the card will be destroyed); and "Destroyed" (indicating that the card has actually been destroyed).

Other status flags or indicators can be used, such as a flag indicating that the address associated with the account is an old/incorrect/bad/invalid address.

The card administration system/software may communicate with a return card storage process or return card storage management program (which could also be implemented as a list, database, or other data structure). The return card storage process/program can be configured to manage the handling a returned prepaid cards that have been designated for temporary storage, and the return card storage process/program may perform one or more operations described herein depending upon the implementation.

The card administration system/software may communicate with a return card destruction process or management program (which could also be implemented as a list, database, or other data structure). The return card destruction process/program can be configured to manage the handling a returned prepaid cards that have been designated for destruction, and the return card destruction process/program may perform one or more operations described herein depending upon the implementation.

The card purchaser/funding source is shown in the example of FIG. 1 as interacting with customer service, although the card purchaser may, during the purchase of the prepaid card for the benefit of the cardholder, interact with others not shown in FIG. 1 during the purchase and funding of the prepaid card.

While FIG. 1 illustrates an example of a system that may be used for implementing an embodiment of the present invention, it is understood that embodiments of the present invention may be implemented in other systems or environments, depending upon the particular implementation.

Figure 3:
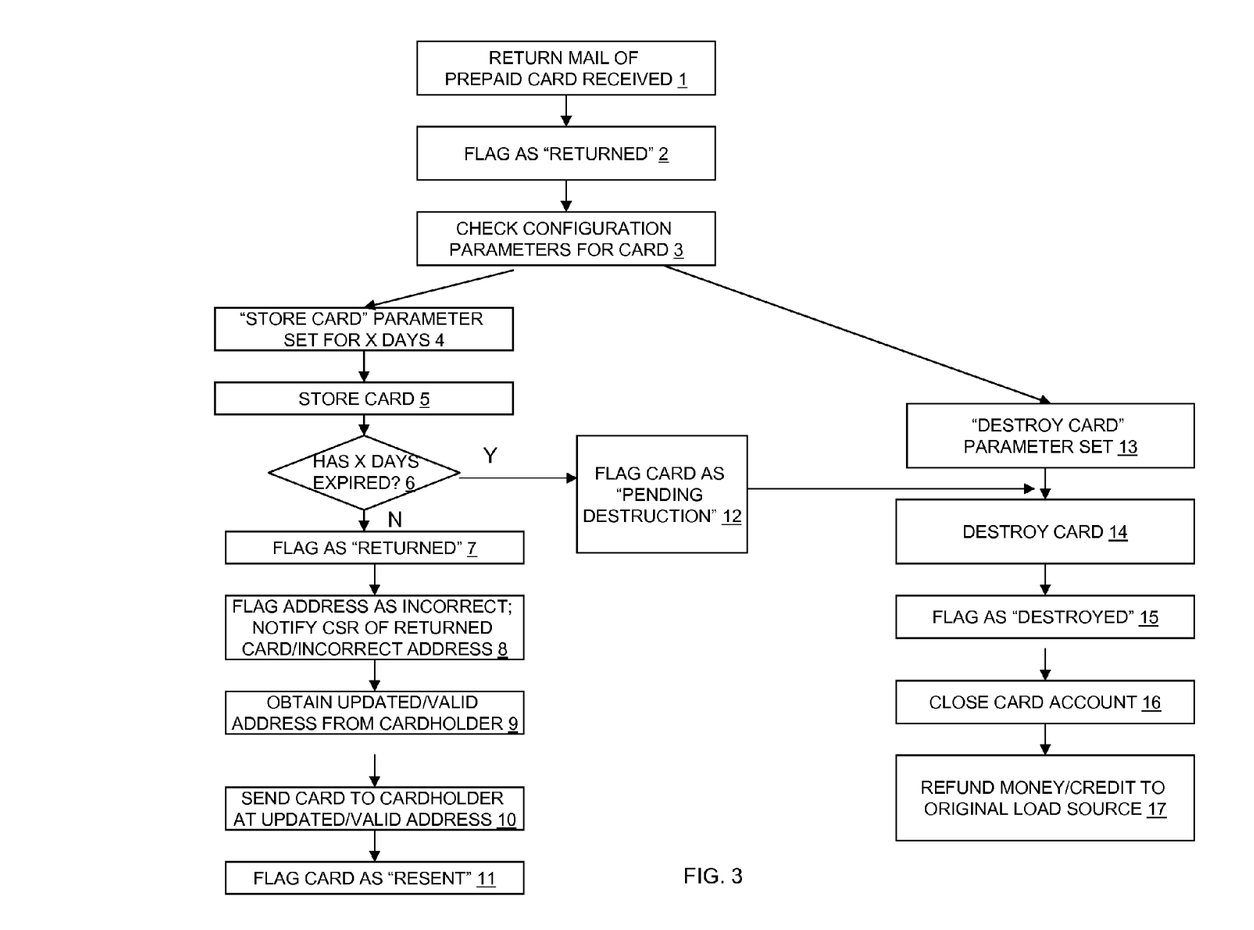
FIG. 3 shows a flowchart illustrating a method for handling of returned prepaid cards, in accordance with one embodiment of the present invention.

FIG. 3 illustrates a flowchart illustrating a method for handling of returned prepaid cards, in accordance with one embodiment of the present invention. At operation 1, return mail of a prepaid card is received. For instance, the return mail of the prepaid card may be received by the issuing Bank, credit card company, or other entity (such as the entity that sent the prepaid card to the cardholder). The fact that the prepaid card has been returned to sender by the Postal Service indicates that the address to which the card was sent is invalid/bad. The operations of FIG. 3 are, in one embodiment, adapted to either destroy the card/attempt to refund or credit the original card purchaser, or re-send the card to the cardholder at an updated and valid address.

At operation 2, information may be flagged as "returned" indicating that the card was returned. Operation 2 may be implemented, for instance, by a mail room personnel entering in the card administration system a flag or other suitable indicator that a particular prepaid card is "returned" and therefore has an invalid address associated with the account.

At operation 3, configuration parameters for this card are checked to determine how the processing of the returned card should be handled. In one example, the card purchaser, at the time of purchase, is provided with one or more options as to how to handle the possible return of the prepaid card. For instance, one option that can be made available to the card purchaser is that a returned prepaid card is to be destroyed and the remaining money is on the account be refunded to the card purchaser. Another option that may be made available to the card purchaser is that a returned prepaid card is to be stored for a desired or specified number of days in order to permit the possible reconciliation of the card with the cardholder, and if reconciliation has not occurred prior to the expiration of the desired number of days, then the card is destroyed and a refund made to the card purchaser.

Assuming that the returned prepaid card received at operation 1 was configured to "store card" upon return, then control is passed to operations 4-12. At operation five, the card is stored, preferably in a secure facility. Operation 6 determines if the desired number of days of storage has expired, and if not, control is passed to operations 7-11. If the desired number of storage days has expired, control is passed to operations 12 and 14-17, described below.

Assuming that the maximum number of storage days has not been exceeded, operation 7 flags the card as "returned". Operation 8 flags the address of the card as incorrect, and in this manner can notify a customer service representative of the returned card status and the incorrect address status associated with this card/account.

At operation 9, an updated and valid address may be obtained from the cardholder, for instance, if the cardholder calls or contacts customer service to obtain the card, since the cardholder has not yet received the card (because the card was returned via mail at operation 1). Also, a customer service representative can attempt to contact the cardholder to obtain the cardholder's new address, or any other convention means of communication can be used to attempt to contact the cardholder to obtain an updated valid address (i.e., via email, mail, fax, telephone, etc.) If the cardholder contacts customer service and provides an updated/valid address, the updated/valid address can be associated with the cardholder's account.

At operation 10, the card may be re-sent to the cardholder using the updated/valid address provided by the cardholder at operation 9. At operation 11, the card status may be flagged or updated as "resent." At this point, it is assumed that the cardholder receives the card, however, if the card is again returned by mail, then the process of FIG. 3 may be repeated, beginning with operation 1.

At operation 6, if the number of days for storage of the card has expired, for instance, if an updated address of the cardholder has not been obtained within the number of permitted storage days, then operation 6 passes control to operation 12. Operation 12 flags the card status as "pending destruction" and control is passed to operations 14-17, described below.

At operation 3, if the configuration parameters for the card indicated that a returned card should be destroyed, then control is passed to operations 13-17. Operation 13 provides an entry point for the destruction of the card and the refund of the balance on the card to the card purchaser/original funding source. At operation 14, the card is destroyed, and at operation 15 the card status is flagged as "destroyed." At operation 16, the account corresponding to the card is closed, and at operation 17, the remaining balance on the card/account is refunded to the original purchaser/load source. For instance, if an individual purchased this card with a credit card or a debit card, a transaction could be created to reverse those funds or refund that money back to the purchaser. If the card was purchased from and loaded with ACH or by cash, information describing the card and the card balance could be provided on a report and sent to the issuer indicating that the issuer would need to determine how to best refund the cash or ACH funds to the purchaser.

Hence, it can be seen that the operations of FIG. 3 may be used to either destroy the returned card and attempt to refund or credit the original card purchaser, or re-send the card to the cardholder at an updated and valid address.

Embodiments of the invention may be used by payment card companies, issuers such as Banks, processors that handle various aspects of payment card transactions, or other entities. Embodiments of the present invention could be used with any type of payment card, depending on the implementation, including but not limited to credit card, debit cards, prepaid cards, reloadable cards, bank cards, or the like.

Embodiments of the invention can be implemented via appropriate software or computer program code instructions in combination with appropriate instruction execution platforms, processor(s), hardware or the like. These instructions may be in the form of a computer program product that can cause a CPU to control operation of a card administration system according to an embodiment of the invention. The combination of hardware and software to perform the functions described can form the means to carry out the processes and/or subprocesses of embodiments of the invention. In this regard, each block in the flowcharts or block diagrams may represent a module, segment, action, or portion of code, which comprises one or more executable instructions or actions for implementing the specified logical function(s). Furthermore, an embodiment of the invention may take the form of a hardware embodiment, a software embodiment (including firmware, resident software, micro-code, etc.) or an embodiment combining software and hardware aspects.

Any suitable computer usable or computer readable medium may be used, taking into account that computer program code to operate a card administration system according to embodiments of the invention may reside at various places. The computer usable or computer readable medium may be, for example but not limited to, an electronic, magnetic, optical, electromagnetic, infrared, or semiconductor system, apparatus, device, or propagation medium. More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device.

In the context of this document, a computer usable or computer readable medium may be any medium that can contain, store, communicate, propagate, or transport the program for use by or in connection with an instruction execution system, platform, apparatus, or device. The computer usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, radio frequency (RF) or other means.

Computer program code for carrying out embodiments of the present invention may be written in an object oriented, scripted or unscripted programming language such as but not limited to Java, Perl, Smalltalk, C++ or the like. However, the computer program code for carrying out embodiments of the present invention may also be written in conventional procedural programming languages, such as the "C" programming language or similar programming languages. It should also be noted that functions and combination of functions described herein can be implemented by special purpose hardware-based systems or operators which perform the specified functions or acts.

While the methods disclosed herein have been described and shown with reference to particular operations performed in a particular order, it will be understood that these operations may be combined, sub-divided, or re-ordered to form equivalent methods without departing from the teachings of the present invention. Accordingly, unless specifically indicated herein, the order and grouping of the operation is not a limitation of the present invention.

It should be appreciated that reference throughout this specification to "one embodiment" or "an embodiment" or "one example" or "an example" means that a particular feature, structure or characteristic described in connection with the embodiment, may be included, if desired, in at least one embodiment of the present invention. Therefore, it should be appreciated that two or more references to "an embodiment" or "one embodiment" or "alternative embodiment" or "one example" or "an example" in various portions of this specification are not necessarily all referring to the same embodiment. Furthermore, the particular features, structures or characteristics may be combined as desired in one or more embodiments of the invention.

What is claimed is:

1. A method for handling a returned prepaid device, comprising:
   receiving at a bank, a payment card company, or a payment card processor, a returned prepaid device;
   indicating, by a computer associated with the bank, the payment card company, or the payment card processor, in the consumer's account that an address of a cardholder who is an intended recipient of the returned prepaid device is invalid;
   determining by the computer associated with the bank, the payment card company, or the payment card processor, whether to store or destroy the received returned prepaid device based on an option chosen by the consumer at a purchase time of the returned prepaid device;
   upon a determination to store the returned prepaid device, storing the returned prepaid device; and
   upon a determination that the returned prepaid device is stored less than a predetermined number of days, obtaining an updated address from the consumer and resending the returned prepaid device to the updated address; and
   upon a determination to destroy the returned prepaid device, closing the consumer's account and crediting funds to an original load source.

2. The method of claim 1, wherein determining whether to store or destroy the returned prepaid device is based on a plurality of predetermined configuration parameters.

3. The method of claim 1, further comprising activating a field in a display indicating that the address of the cardholder is invalid.

4. The method of claim 1, further comprising alerting a consumer service representative that the address of the cardholder is invalid.

5. The method of claim 1, further comprising:
receiving an updated address from the consumer; and
indicating in the consumer's account that the updated address of the cardholder is valid.

6. The method of claim 1, wherein the cardholder is the consumer and the returned prepaid device is a payment card.

7. An article of manufacture comprising:
a computer useable medium having a computer readable program code embodied therein, the computer readable program code adapted to be executed to implement a method comprising:
indicating in a consumer's account that an address of a cardholder who is an intended recipient of a returned prepaid device is invalid upon receipt of the returned prepaid device by a bank, a payment card company, or a payment card processor that sent the returned prepaid device corresponding to the consumer's account; and
determining whether to store or destroy the returned prepaid device by the bank, the payment card company, or the payment card processor based on an option chosen by the consumer at a purchase time of the returned prepaid device;
upon a determination to store the returned prepaid device, storing the returned prepaid device;
upon a determination that the returned prepaid device is stored less than a predetermined number of days, obtaining an updated address from the consumer and resending the returned prepaid device to the updated address; and
upon a determination to destroy the returned prepaid device, closing the consumer's account, and
crediting funds to an original load source address.

8. The article of manufacture of claim 7, further comprising activating a field in a display indicating that the address of the cardholder is invalid.

9. The article of manufacture of claim 7, further comprising alerting a consumer service representative that the address of the cardholder is invalid.

10. The article of manufacture of claim 7, further comprising:
receiving an updated address from the consumer; and
indicating in the consumer's account that the updated address of the cardholder is valid.

11. The article of manufacture of claim 7, wherein the cardholder is the consumer and the returned prepaid device is a payment card.

12. A computer comprising:
a processor; and
a computer readable medium coupled to the processor, wherein the computer readable medium comprise code executable by the processor, the computer readable medium comprising:
code for indicating in an account of a consumer associated with a returned prepaid device that an address of a cardholder who is an intended recipient of the returned prepaid device is invalid, wherein the indication is made upon receipt of the returned prepaid device by a bank, a payment card company, or a payment card processor that sent the returned prepaid device; and
code for determining whether to store or destroy the returned prepaid device by the bank, the payment card company, or the payment card processor based on an option chosen by the consumer at a purchase time of the returned prepaid device, code for upon a determination of the option chosen by the consumer at a purchase time of the returned prepaid device that the returned prepaid device is store the returned prepaid device, storing the returned prepaid device;
code for upon a determination of the option chosen by the consumer at a purchase time of the returned prepaid device that the returned prepaid device is stored less than a predetermined number of days, obtaining an updated address from the consumer and resending the returned prepaid device to the updated address; and
code for upon a determination of the option chosen by the consumer at a purchase time of the returned prepaid device that the returned prepaid device is to destroy the returned prepaid device, closing the consumer's account and crediting funds to an original load source.

13. A method of processing a returned prepaid device, comprising:
receiving at a bank, a payment card company, or a payment card processor, a returned prepaid device, placing an indicator of an returned/undeliverable status, by a computer associated with the bank, the payment card company, or the payment card processor, in a consumer's account, wherein the returned/undeliverable status indicates that a mailing address of a cardholder is invalid; and
determining, by the computer associated with the bank, the payment card company, or the payment card processor, whether to store or destroy the returned prepaid card based on an option selected by the consumer at a purchase time of the returned prepaid device, wherein the option was selected from a plurality of options;
upon a determination of the option chosen by the consumer at a purchase time of the returned prepaid device that the returned prepaid device is store the returned prepaid device, storing the returned prepaid device;
upon a determination of the option chosen by the consumer at a purchase time of the returned prepaid device that the returned prepaid device is stored less than a predetermined number of days, obtaining an updated address from the consumer and resending the returned prepaid device to the updated address; and
upon a determination of the option chosen by the consumer at a purchase time of the returned prepaid device that the returned prepaid device is to destroy the returned prepaid device, closing the consumer's account and crediting funds to an original load source.

14. The method of claim 1 wherein the bank, payment card company or payment card processor is an entity that sent the returned prepaid card to the cardholder.

15. The method of claim 1 wherein the prepaid device is a phone, key fob, personal digital assistant, pager, smart media, or transponder.

16. The method of claim 5 wherein indicating in the consumer's account that the updated address of the cardholder is valid includes using a status indicator.

17. The method of claim 1, upon a determination to store the prepaid device, further comprising: indicating in the consumer's account that the prepaid device is being stored.

18. The method of claim 1, upon a determination to destroy the returned prepaid device, further comprising: indicating in the consumer's account that the prepaid device is to be destroyed.

19. The method of claim 5 further comprising sending the returned prepaid device to the updated address.

20. The method of claim 19 further comprising indicating in the consumer's account that the prepaid device has been sent.

21. The method of claim 1 wherein upon determination that the returned prepaid device is stored more than a predetermined number of days, indicating in the consumer's account that the prepaid device is to be destroyed.

22. The method of claim 1 wherein the returned prepaid device is returned to the bank, payment card company, or payment card processor, from a postal service.

23. The article of manufacture of claim 7, wherein determining whether to store or destroy the returned prepaid device is based on a plurality of predetermined configuration parameters.

24. The method of claim 13, wherein the plurality of options comprises:
   an option of destroying the returned prepaid device and refunding a balance on the returned prepaid device to an original load source; and
   an option of storing the returned prepaid card for a specified number of days, destroying the returned prepaid card upon expiration of the specified number of days, and refunding the balance on the returned prepaid device to the original load source upon expiration of the specified number of days.

* * * * *

UNITED STATES PATENT AND TRADEMARK OFFICE
CERTIFICATE OF CORRECTION

PATENT NO. : 8,290,832 B2  
APPLICATION NO. : 11/757983  
DATED : October 16, 2012  
INVENTOR(S) : Justin T. Monk It is certified that error appears in the above-identified patent and that said Letters Patent is hereby corrected as shown below:

In the Claims:

In claim 12, Column 7, Line 62, after "sent the returned prepaid device;" delete "and"

In claim 12, Column 7, Line 67, after "device" replace "," with --;--

In claim 12, Column 8, Line 5, after "device;" insert --and--

In claim 12, Column 8, Lines 6-8, delete "of the option chosen by the consumer at a purchase time of the returned prepaid device"

In claim 12, Column 8, Lines 12-14, delete "of the option chosen by the consumer at a purchase time of the returned prepaid device that the returned prepaid device is"

In claim 13, Column 8, Line 21, after "card processor, a returned prepaid device" replace "," with --;-- and then start a new paragraph for "placing an . . ."

In claim 13, Column 8, Lines 35-37, after "upon a determination" insert --to-- and delete "of the option chosen by the consumer at a purchase time of the returned prepaid device that the returned prepaid device is"

In claim 13, Column 8, Line 38, after "device, storing the returned prepaid device;" insert --and--

In claim 13, Column 8, Lines 39-40, delete "of the option by the consumer at a purchase time of the returned prepaid device"

In claim 13, Column 8, Lines 45-47, delete "of the option chosen by the consumer at a purchase time of the returned prepaid device that the returned prepaid device is"

Signed and Sealed this  
Tenth Day of September, 2013

Teresa Stanek Rea  
*Acting Director of the United States Patent and Trademark Office*